UNITED STATES PATENT OFFICE.

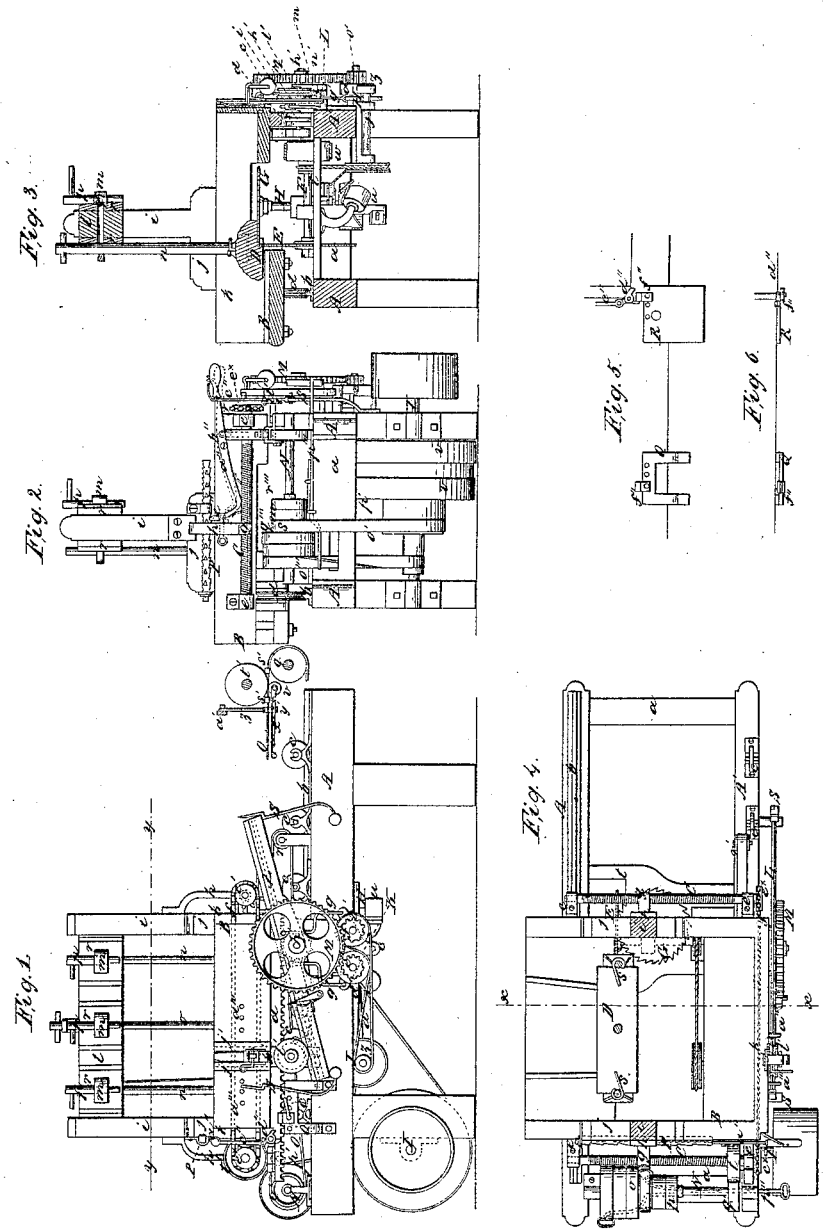

JAMES H. BACHELDER, OF ROME, MICHIGAN.

METHOD OF HOLDING AND SETTING LOGS IN CIRCULAR SAWING MACHINES.

Specification of Letters Patent No. 18,269, dated September 29, 1857.

*To all whom it may concern:*

Be it known that I, JAMES H. BACHELDER, of Rome, in the county of Lenawee and State of Michigan, have invented a new and Improved Sawing-Machine; and I do hereby declare that the following is a full, clear, and exact description of the same, reference being had to the annexed drawings, making a part of this specification, in which—

Figure 1, is a side view of my improvement. Fig. 2 is an end view of ditto. Fig. 3, is a transverse vertical section of ditto taken on the line (x) (x) Fig. 4. Fig. 4 is a horizontal section of ditto taken on the line (y) (y) Fig. 1. Figs. 5, 6 and 7 are detached views of portions of the device by which the log is set to the saws.

Similar letters of reference indicate corresponding parts in the several figures.

This invention relates to an improvement in that class of sawing machines which are designed for sawing lath, fence pickets and similar stuff or articles direct from the log.

The object of the invention is to obtain by simple and practicable means a self-feeding and also a self-setting machine, and one perfectly automatic in its action throughout.

To enable those skilled in the art to fully understand and construct my invention, I will proceed to describe it.

A, A', represent two parallel beams, the ends of which are connected by crossties (a). These beams may be supported at a suitable or convenient height in any proper manner. On one of the beams A, a V-shaped guide or way (b) is placed, and on the opposite beam A' a series of rollers (c) are placed.

B represents a rectangular frame or carriage which is placed on the beams A, A'. This carriage has rollers (d) (d) at one side, which rollers work on the guide or way (b). At the opposite side of the frame or carriage a rack (d) is attached, said rack having a longitudinal groove made in it to receive the edges of the rollers (c) on which the rack (d) rests see Fig. 3 in which the way the carriage is supported at both sides is distinctly shown.

At each end of the carriage B, and at its outer side, a horizontal screw C, is placed. The ends of these screws are fitted in bearings (e) attached to the ends of the carriage, both screws and the mode of attachment are shown clearly in Fig. 4. The screws are allowed to turn in their bearings and they project at one end beyond or through their bearings and have each a toothed wheel ($e^x$) secured to them, around which wheels an endless chain (f) passes, the teeth of the wheels passing through the links of the chain and preventing the slipping of the same. Each screw C passes or works through a nut (g). These nuts are formed at the lower ends of curved bars (h), the upper ends of which are attached to the lower ends of uprights (i) (i) which are secured to horizontal pieces (j) which rest and are allowed to slide freely on the end pieces (k) of the carriage. The upper ends of the uprights (i) (i) are connected by a cross piece (l) which is slotted horizontally and has plates (m) placed in it, said plates being also slotted vertically and having vertical rods (n) (n) (o) passing through them respectively at one side of the crosspiece (l) as shown in Fig. 1. Through the opposite ends of the plates (m) and at the opposite side of the cross piece (l) rods (p) pass, said rods having eccentrics (q) on them. A block (r) is placed on each end of the plates (m) between the sides of the cross piece (l) and the rods (p) and (n) (n) (o). See Figs. 2 and 3.

By turning the rods (p) the upper ends of the rods (n) (n) (o) will be firmly clamped to the cross piece (l). The lower end of the rod (o) has a screw formed on it, and is screwed into the top surface of the log D. The lower ends of the rods (n) (n) are curved and forked and are driven into the ends of the log D, the forks being secured in the ends of the log by hooks (s), which pass around the lower parts of the rods (n) (n), the inner ends being driven into the upper surface of the log D see Fig. 4.

E represents a vertical circular saw, which is secured on the end of an arbor F, placed transversely between the two beams A, A', and having its bearings attached to, or formed on, a metal plate (t) between said beams. G is a horizontal saw which is placed at the upper end of an arbor H, said arbor passing through the plate (t) and having its lower end stepped in a pendent (u). The edge of the horizontal saw G just touches the plane in which the vertical saw E is placed. See Fig. 3. Both saws E, G, are driven from the power or driving shaft I by belts (v) (v) which pass around pulleys and their respective arbors F, H.

J is a small shaft placed underneath the beam A', and driven by a belt (w) from the saw arbor F, see Fig. 3. The shaft J has a pully (z) on its outer end, and a belt (a') passes around the pulley (z) said belt also passing around a pulley (b') which has its axis attached to a vibrating plate K, which is pivoted to the side of the machine as shown at (c'). A pulley (d') precisely similar to (b') is attached to the opposite end of plate K, the belt (a') passes underneath the pulley (d') which has a sufficient bearing upon the belt to allow the latter to rotate it.

To the outer sides of the pulleys (b') (d') pinion (e') (f') are attached. See Fig. 1. To each end of the plate K a bent rod (g') is attached. The upper ends of these rods are attached to a bar L, which is placed loosely on a small shaft (h') on the upper part of the beam A'. The bar being allowed to swing loosely on said shaft. A pinion (i') is placed on the inner end of shaft (h') and a toothed wheel M is placed on its outer end. The pinion (i') gears into the rack (d).

In the side of the carriage B which adjoins the bar L two vertical guides (j') (j') are secured, and between these guides a slide (k') is placed, said slide having a roller (l') at its lower end. A pin (m') is also attached to the lower end of slide (k') the pin fitting in a longitudinal slot (n') made in the inner side of bar L. See Fig. 3.

N is a shaft which is placed at one end of the beams A, A'. This shaft is driven by belts (o') (p'), one of which (o') is a cross belt. The shaft N has a pulley (q') at one end around which an endless belt O passes, said belt also passing around a pulley (r') on the beam A'. The belt O passes through loops (s') (s') attached to the carriage B and underneath a pulley (t') on one of the screws C; see Fig. 7. To the underside of the carriage B and adjoining the rack (a) a plate (u') is pivoted at one end, and in the opposite end a roller (v') is placed. A spring (x') is attached to the under side of the plate (w') and a loop (y') is fitted over both the plate (w') and spring (x'), said loop being connected to a bar (z') the upper end of which is attached to a lever (a'') which is pivoted to the carriage B as shown at (b''). See Fig. 2. The outer end of lever (a'') has a pendent bar (c'') placed loosely on it, the lower end of said bar being pivoted to the upper end of a forked lever (d'') which is pivoted to the carriage B. The inner end of the lever (a'') works underneath a pawl (e'') which is placed below a circular rod P, attached to one of the pieces (j'') which rests on the carriage B. The rod P has several series of rack teeth formed on it, the teeth of the several series being placed at different distances apart. To the outer side of the beam A' two plates Q, R, are attached, said plates having each an adjustable projection (f'') placed on them. To the outer side of the beam A' two spring catches S, S, are attached one opposite each end of the bar L.

The operation is as follows: The log D is secured to the lower ends of the rods (n) (n) (o), and motion is given the shaft I in any proper manner, the two saws E, G, are rotated by the belts (v) (v) in reverse or opposite directions so that the log will not be affected by their action, the force or motion of one neutralizing that of the other. The log is fed to the saw in consequence of the rotation of the pinion (i') which gears into the rack (d) the pinion being operated or rotated in consequence of the wheels (a') (b') gearing into the wheel M which is on the same shaft (h') as the pinion (i') said pinion moving the carriage B. The carriage and consequently the log have a reciprocating motion and this motion is produced in consequence of the wheels (d') (b') gearing alternately into the wheel M, said wheels being operated by the bar L which is inclined or moved in one position as the carriage is fed along by the roller (l') and is inclined or moved in the opposite position as the movement of the carriage is reversed. The bar L is retained in its two positions by the spring catches S, S and these catches are alternately thrown from the bar L by pins (a''') on the side of the carriage and the bar actuated, or turned at the end of each movement of the carriage B by the weight of the slide (k'). The saws cut or act upon the log at both movements so that no time is lost in gigging bark. And the saws it will be seen operate similar to those of other machines for similar purposes. The log D is set to the saws at the end of each stroke or movement of the carriage, by actuating the screws C, C. This is done by means of the small forked lever (d'') which strikes against the projections (s'') on the plates Q, R, at the end of each stroke, said levers (d'') actuates the lever (a'') and causing the loop (y') to draw up the roller (v') against the endless belt O, so that said belt will rotate the wheel (t') on one of the screws C, at the same time that the loop (y') is raised, the pawl (e'') is thrown from the rack P and the log D is moved laterally or set to the log, the length of the movement of the log being determined by the space between the teeth on the rod P and consequently the log may be moved laterally a greater or less distance by so turning the rod so that the proper series of teeth may be presented to the pawl.

When one row or course of stuff is sawed off from the log D, the log is moved back to its original position, that is, to the outer or left side of the vertical saw E, by shifting the belt (o') by means of the belt shipper ($p'''$) from the idle pulley ($o'''$) upon the working pulley ($q'''$) the belt ($p'$) by the same movement being thrown from its working pulley ($s'''$) upon the idle pulley ($r'''$).

Thus it will be seen that the machine works automatically the log being fed to the saws in both directions in consequence of the reciprocating motion given the carriage B, and the log set to the saws at the end of each stroke or movement of the carriage.

I am aware that machines have been previously devised for accomplishing the same object as the one herein described. The arrangement of the two circular saws is not new, they have been previously used as herein shown and for the same purpose. In view of these facts therefore I confine myself to the particular means employed for effecting the purpose set forth, that is to say,

What I claim as new and desire to secure by Letters Patent, is—

1. I claim setting the log D to the saws or giving it its lateral movement at the termination of each stroke or movement of the carriage B, by means of the screws C, C, on which the nuts ($g$) on the uprights ($i$) work, the screws C being turned at the proper time by means of the belt O, which is made to act upon the wheel ($t'$) by means of the loop ($y'$) attached to lever ($a''$) the lever being actuated by the forked lever ($d''$) coming in contact with the projections ($f''$) on the plates Q, R, attached to beam A'—the length of movement of the log being determined or regulated by the rack rod P pawl ($e''$) arranged as shown or any equivalent device.

2. I claim securing the log D in the carriage B, or, to the crosspiece ($l$) supported therein by uprights ($i$) by means of the rods ($n$) ($n$) ($o$) attached to the crosspiece ($l$) by means of the plates ($m$) and rods ($p$) having eccentrics ($q$) on them, the eccentrics being in one end of the plates and the rods ($n$) ($n$) ($o$) passing through the opposite ends as shown and described.

JAMES H. BACHELDER.

Witnesses:
EDWARD P. ALLIS,
HENRY I. ROOT.